(12) United States Patent
Su

(10) Patent No.: US 11,881,776 B2
(45) Date of Patent: Jan. 23, 2024

(54) ADJUSTING A SWITCHING FREQUENCY OF A VOLTAGE REGULATOR TO OPERATE AT A PREDETERMINED POWER EFFICIENCY

(71) Applicant: HEWLETT PACKARD ENTERPRISE DEVELOPMENT LP, Houston, TX (US)

(72) Inventor: Jen-Ta Su, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 228 days.

(21) Appl. No.: 17/328,457

(22) Filed: May 24, 2021

(65) Prior Publication Data
US 2022/0376621 A1 Nov. 24, 2022

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC .. H02M 3/158; H02M 1/0009; H02M 1/0019; H02M 1/0048; H02M 1/008; H02M 3/156; H02M 3/157; H02M 1/0054; Y02D 10/00
See application file for complete search history.

(56) References Cited

U.S. PATENT DOCUMENTS

| 6,396,169 | B1 | 5/2002 | Voegeli et al. |
| 7,609,047 | B2 | 10/2009 | Ravichandran |
| 7,889,517 | B2 | 2/2011 | Artusi et al. |
| 8,994,346 | B2 | 3/2015 | Rahardjo et al. |
| 9,891,700 | B2 | 2/2018 | Tschirhart et al. |
| 2005/0046400 | A1* | 3/2005 | Rotem ............... G06F 1/3203 323/234 |
| 2010/0026208 | A1* | 2/2010 | Shteynberg ....... H05B 45/3725 315/297 |
| 2010/0277151 | A1* | 11/2010 | Tsai ................... H02M 3/1584 323/283 |

(Continued)

OTHER PUBLICATIONS

Shirazi et al., "An Autotuning Digital Controller for DC-DC Power Converters Based on Online Frequency-Response Measurement", vol. 24, No. 11, IEEE Transactions On Power Electronics, Nov. 2009, 12 pages.

(Continued)

*Primary Examiner* — Shawki S Ismail
*Assistant Examiner* — Htet Z Kyaw
(74) *Attorney, Agent, or Firm* — Hewlett Packard Enterprise Patent Department

(57) ABSTRACT

Examples relate to adjusting a switching frequency of a voltage regulator to operate the voltage regulator at a predetermined power efficiency. Examples described herein include receiving load information corresponding to a component that receives regulated power from the voltage regulator, determining, from a repository, a predetermined value of the switching frequency of the voltage regulator based on the load information to attain the predetermined power efficiency of the voltage regulator and adjusting the switching frequency of the voltage regulator to the predetermined value of the switching frequency to operate the voltage regulator at the predetermined power efficiency.

20 Claims, 4 Drawing Sheets

(56) References Cited

U.S. PATENT DOCUMENTS

| | | | |
|---|---|---|---|
| 2013/0076128 A1* | 3/2013 | Nee | H02J 5/00 |
| | | | 180/65.21 |
| 2013/0207630 A1* | 8/2013 | Rahardjo | G06F 1/324 |
| | | | 323/283 |
| 2014/0380070 A1 | 12/2014 | Hua | |
| 2015/0331435 A1* | 11/2015 | Mac | G05B 15/02 |
| | | | 700/298 |

OTHER PUBLICATIONS

Wang et al., "Power Saving Design for Servers under Response Time Constraint", IEEE 22nd Euromicro Conference on Real-Time Systems, 2010, 10 pages.

Zhang et al., "Advanced Pulse Width Modulation Controller ICs for Buck DC-DC Converters", Technical Report No. UCB/EECS-2006-175, Fall 2006, 128 pages.

Peterchev A. V. et al, "Digital Multimode Buck Converter Control With Loss-Minimizing Synchronous Rectifier Adaptation," Nov. 2006, IEEE Transactions on Power Electronics, vol. 21, No. 6, http://power.eecs.berkeley.edu/publications/PeterchTPELNov06Digmm.pdf.

Zhang, J. et al., "Advanced Pulse Width Modulation Controller ICs for Buck DC-DC Converters," Dec. 14, 2006, https://digitalassets.lib.berkeley.edu/techreports/ucb/text/EECS-2006-175.pdf.

\* cited by examiner

ADJUSTING A SWITCHING FREQUENCY OF A VOLTAGE REGULATOR TO OPERATE AT A PREDETERMINED POWER EFFICIENCY

BACKGROUND

Voltage regulators are commonly utilized in a variety of computing devices and portable electronic devices to maintain voltages and supply regulated power to various components such as processors, memories, hard disks, and the like. The voltage regulators are configured to regulate voltages applied to the components and supply currents to the components. Further, the voltage regulators can be controlled to optimize the voltages and the currents depending on the loads (e.g., computation loads) of the components to meet the power requirements of the components in order to improve the performance of the components and conserve power.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
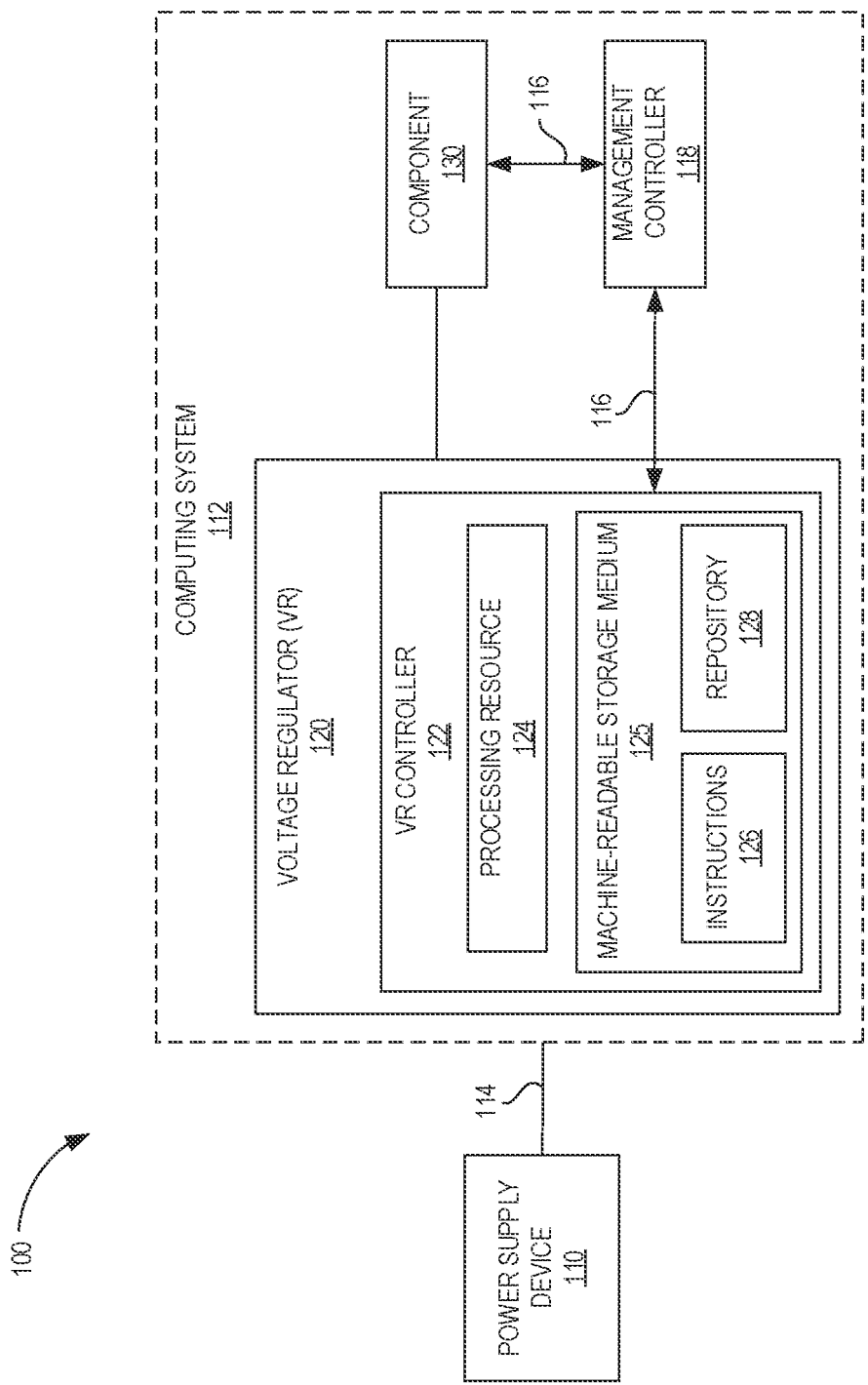
FIG. 1 is a block diagram of a system including a power supply device and a computing system, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The presence of broadening words and phrases such as "one or more," "at least," "but not limited to" or other like phrases in some instances shall not be read to mean that the narrower case is intended or required in instances where such broadening phrases may be absent.

Voltage regulators such as, but are not limited to, DC voltage regulators (e.g., using a buck converter, a boost converter, or buck-boost converter) may be implemented in a computing system (e.g., a server) to supply regulated power to various components (e.g., processors and memories) of the computing system. The voltage regulators may be operated at certain loads (e.g., low and high loads) to meet the power requirements of the component to improve the performance of the component and save power. Operating a voltage regulator for a certain load may herein mean that the voltage regulator is operated to generate a voltage and supply a current depending on a load of the component at a point in time. The voltage generated by the voltage regulator may be referred to herein as an output voltage ($V_{out}$) and the current supplied by the voltage regulator to the component may be referred to herein as a load current ($I_{load}$).

Although the voltage regulators may be controlled to improve the performance of the components, the voltage regulators themselves may operate inefficiently, in certain situations. Operating inefficiently may mean that the voltage regulators operate at power efficiencies lower than their maximum power efficiencies due to power losses in the voltage regulators. A power efficiency of a voltage regulator may refer to a ratio of power generated (e.g., an output power) by the voltage regulator to power received (e.g., an input power) by the voltage regulator. The input power may generally be equal to the output power and the power losses within the voltage regulator. Accordingly, the power efficiency of the voltage regular reduces as the power losses within the voltage regulator increase.

Typically, voltage regulators are designed to operate at their maximum power efficiencies at high loads to ensure thermal management. Such approaches tend to compromise the power efficiencies of the voltage regulators when operating at lower loads due to power losses within the voltage regulators. Hence, these approaches may not be efficient for overall power saving within the computing system. For example, a given voltage regulator may be designed to operate at a switching frequency that is optimized for the voltage regulator to operate at its maximum power efficiency at a high load (e.g., 100 percent load). The switching frequency of the given voltage regulator is a frequency at which switches (e.g., transistors such as a metal-oxide-semiconductor field-effect transistor (MOSFET)) in the given voltage regulator are operated. Generally, the switching frequency may cause a power loss (which may be referred to herein as "switching loss" or "switching power loss") within the given voltage regulator due to the transition of the switch from its on-state to off-state or vice-versa. In this manner, the switching frequency affects the overall power losses in the given voltage regulator and thereby a power efficiency of the given voltage regulator. During operation, if a load of the component drops and the given voltage regulator continues to operate at the same switching frequency as designed for the high loads, the switching power loss may increase within the given voltage regulator. As a result, the given voltage regulator operates at the power efficiency which is lower than its maximum power efficiency.

To address one or more of the above-mentioned challenges, the present disclosure provides example methods and systems for adjusting a switching frequency of a voltage regulator to improve a power efficiency of the voltage regulator. In particular, example systems and methods described herein adjust the switching frequency of the voltage regulator based on load information of a component, of a computing system, that receives regulated power from the voltage regulator. The example systems and methods may utilize a repository (e.g., a lookup table) to determine a predetermined value of the switching frequency for the voltage regulator based on the load information of the component. The predetermined value of the switching frequency may be an optimized value of the switching frequency that is determined to reduce a switching power loss within the voltage regulator based on the load information and thereby attain a predetermined power efficiency of the voltage regulator. The predetermined power efficiency of the voltage regulator may be an improved power efficiency of the voltage regulator that may be attained by reducing the switching power loss within the voltage regulator at the predetermined value of the switching frequency and based on the load information. By adjusting the switching frequency of the voltage regulator to the predetermined value of the switching frequency, the voltage regulator may operate at the predetermined power efficiency. In this manner, the examples described herein may enable multiple voltage regulators implemented in the computing system to operate with improved power efficiencies and increase overall power saving due to more efficient power utilization by the voltage regulators over existing techniques.

In accordance with some aspects, a controller of a voltage regulator may receive load information corresponding to a component that receives regulated power from the voltage regulator. In an example, the controller may be configured to manage the operation of the voltage regulator. The controller may determine, from a repository, a predetermined value of a switching frequency of the voltage regulator based on the load information to attain a predetermined power efficiency of the voltage regulator. The controller may then adjust the switching frequency of the voltage regulator to the predetermined value of the switching frequency to operate the voltage regulator at the predetermined power efficiency.

Referring now to the drawings, FIG. 1 is a block diagram illustrating an example system 100 in which the technology described herein may be implemented. The system 100 may include a power supply device 110 and a computing system 112. The computing system 112 may be a server, a computer appliance, a workstation, a desktop computer, a laptop computer, a mobile device, a personal digital assistant (PDA), an embedded system, a switch, a router, or any other processing device or equipment including a processing resource. In an example, the computing system 112 may be a part of a datacenter. In certain examples, the computing system 112 may be a server (e.g., a rack server or a blade server). The server may include a computer (e.g., hardware) and/or a computer program (machine-readable instructions) that may process requests from other computers (e.g., computers of clients) over a network. In some examples, the computing system 112 may be a management system capable of managing and monitoring a server in a datacenter.

The computing system 112 may be configured to receive power from the power supply device 110 via a connection 114. The connection 114 may be a cable (e.g., a category 5 (CAT5), category 5 enhanced (CAT5E), or category 6 (CAT6) cable), communication link (e.g., I2C serial communication bus), or Power Management Bus (PMBUS). The power supply device 110 may be deployed on-premise or remotely from the computing system 112. Although FIG. 1 shows one computing system 112 coupled to the power supply device 110 through the connection 114, more than one computing system may be coupled to the power supply device 110 through respective connections.

In some examples, the computing system 112 may include a component 130 coupled to a voltage regulator 120 (hereinafter referred to as "VR 120"). The component 130 may be a processor (e.g., a central processing unit (CPU)) or another electronic component (e.g., a memory/storage associated with the processor, or the like) located within the computing system 112 that operates using electric power. The VR 120 may be configured to supply regulated power to the component 130 by way of regulating the voltage applied to the component 130 and delivering a load current ($I_{load}$) to the component 130. When the VR 120 receives an input voltage ($V_{in}$) from the power supply device 110, the VR 120 may generate an output voltage ($V_{out}$) to be applied to the component 130 and deliver the load current ($I_{load}$) to the component. In an example, the VR 120 may be a DC voltage regulator such as, but not limited to, a buck converter. Although the VR 120 is illustrated herein as a single unit, the VR 120 may be implemented as a collection of separate components such as power transistors, capacitors, inductors, etc.

In an example, the operation of the VR 120 may be managed and controlled by a controller 122 (hereinafter referred to as "VR controller 122"). The VR controller 122 may be a microprocessor or a microcontroller based component, or instead, be a service or application executing on one or more computing devices. The VR controller 122 may be attached to, be part of, be associated with, and/or be otherwise related to the VR 120. In the examples described herein, the VR controller 122 may be located within the VR 120 (e.g., embedded in the circuitry of the VR 120). In other examples, the VR controller 122 may be located outside the VR 120. The VR controller 122 may include a processing resource 124 communicatively coupled to a machine-readable storage medium 125 including instructions 126 that, when executed by the processing resource 124, cause the VR controller 122 to undertake certain actions and functionalities as described herein.

In examples described herein, the processing resource 124 may include, for example, one processor or multiple processors included in a single computing device or distributed across multiple computing devices. As used herein, a "processor" may be at least one of a central processing unit (CPU), a semiconductor-based microprocessor, microcontroller, a graphics processing unit (GPU), a field-programmable gate array (FPGA) other hardware devices such as but not limited to an integrated circuit (IC), control logic, electronic circuits, or combinations thereof that include a number of electronic components. In examples described herein, the processing resource 124 may fetch, decode, and execute the instructions 126 stored in the machine-readable storage medium 125 to perform the functionalities described in relation to the instructions 126 stored on the machine-readable storage medium 125. The machine-readable storage medium 125 may be located either in the computing device executing the instructions 126, or remote from but accessible to the computing device (e.g., via a computer network) for execution. In the examples illustrated herein, the VR controller 122 may be implemented by one machine-readable storage medium, or multiple machine-readable storage media.

As used herein, a "machine-readable storage medium" may be any electronic, magnetic, optical, or other physical storage apparatus to contain or store information such as executable instructions, data, and the like. For example, any machine-readable storage medium 125 described herein may include any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium 125 described herein may be non-transitory.

The component 130, during its operation, may switch among multiple power modes (e.g., a high power mode or a low power mode) depending on the load of the component 130. Each power mode requires a voltage level to be applied to the component 130 depending on a magnitude of voltage that it requires to operate. For example, in a high power mode, the component 130 may operate at a first voltage that is higher than a second voltage at which the component 130 operates in a low power mode. Switching from one power mode to another power mode may correspond to any transition of the voltage from the relatively high magnitude to the relatively low magnitude (i.e., decrease in the voltage) and vice-versa (i.e., increase in the voltage).

The load of the component 130 may be categorized into a plurality of load levels ranging from 1 percent to 100 percent, for example. A load level of the plurality of load levels that corresponds to the maximum load of the component 130 may be referred to as the highest load level (i.e., 100 percent). Other load levels corresponding to the load less than the maximum load of the component 130 may be determined relative to the highest load level. For example, when the component 130 has a load that is half of the maximum load of the component 130, the load level of the component 130 may be 50 percent. Further, during operation in any given power mode, the component 130 may draw a certain amount of current (e.g., the load current $I_{load}$) from the VR 120 based on the corresponding load level of the component 130 and a maximum load current supported by the component 130. In some examples, the load level of the component 130 may be inferred from a value of the load current $I_{load}$ that the component 130 draws from the VR 120 in the given power mode. In some examples, the value of the load current $I_{load}$ may be proportional to the load level of the component 130.

In the examples described herein, as the VR 120 regulates the voltage applied to the component 130, the voltage generated (i.e., the output voltage) by the VR 120 is the voltage applied to the component 130. The computing system 112 may control the voltage applied to the component 130 by controlling the output voltage of the VR 120. In some examples, a management controller 118 of the computing system 112 may communicate with the VR 120, and more particularly, the VR controller 122 that manages the operation of the VR 120, to generate the output voltage at a desired magnitude. In an example, the management controller 118 may communicate with the VR controller 122 to increase or decrease the output voltage by a certain value. The management controller 118 may be a baseboard management controller (BMC) of the computing system 112. In some examples, the management controller 118 can be used to implement various services (e.g., such as remote console access, remote reboot, and power management functionality, monitoring health of the system, access to system logs, and the like) for the computing system 112. The management controller 118 can be implemented using a separate processor from a processor (e.g., CPU) of the computing system 112 that is used to execute a high-level operating system. The management controller 118 may perform management operations for various components (e.g., the component 130) on the computing system 112.

In some examples, the management controller 118 has capabilities for managing power supplied to the component 130. To this end, the management controller 118 may be communicatively coupled to the VR controller 122 and the component 130 through a communication link 116. The communication link 116 may be a bi-directional communication link such as an Inter-Integrated Circuit (I2C or $I^2C$) communication bus. In this manner, the management controller 118 may have two-way communication between the VR 120 and the component 130 via the communication link 116. In an example, the management controller 118 may identify a given load level of the component 130 at a point in time. Further, the management controller 118 may send a command to the VR controller 122 to operate the VR 120 based on the given load level or the power mode of the component 130. In response to the command, the VR controller 122 may operate the VR 120 to generate the output voltage at a desired magnitude and supply the load current of a desired value to the component 130 in order to fulfil the power requirements of the component 130 based on the given load level of the component 130. Furthermore, the management controller 118 may communicate operational information of the component 130 to the VR controller 122 via the communication link 116. In an example, the operational information may include the load current.

In accordance with the examples described herein, the VR controller 122 may further perform several functionalities for adjusting a switching frequency of the VR 120 and operating the VR 120 at a predetermined power efficiency. In an example, the functionalities performed by the VR controller 122 may be performed by the processing resource 124 by executing the instructions 126 stored in the machine-readable storage medium (e.g., a non-transitory machine-readable storage medium) 125.

In some examples, the VR controller 122 may store a repository 128 in the machine-readable medium 125. The repository 128 may include a plurality of predetermined values of the switching frequency of the VR 122 corresponding to the plurality of load levels of the component 130 or a plurality of values of the load current, each value of the load current being indicative of a load level of the plurality of load levels. The plurality of load levels of the component 130 may include load levels ranging from 1 percent to 100 percent. The load levels in the plurality of load levels may be set in an arithmetic sequence with a common difference of 1 percent, 2 percent, 5 percent, 10 percent, or the like. For example, the load levels may include 10 percent, 20 percent, 30 percent . . . 100 percent. Further, as noted, each of the plurality of load levels of the component 130 may be inferred from a value of the load current $I_{load}$ that the component 130 draws from the VR 120 at that load level. In an example, a value of the load current may be determined corresponding to each load level of the component 130 based on the maximum load current (e.g., rated current) of the component 130. For example, if the maximum load current of the component 130 is 205 amperes (A), a value of the load current corresponding to 80 percent load level of the component 130 is 164 A and a value of the load current corresponding to 60 percent load level is 123 A.

Each of the predetermined values of the switching frequency of the VR 120 may be a value of the switching frequency that may be determined to reduce the switching power loss within the VR 120 at the corresponding load level or for the corresponding value of the load current. In an example, each of the predetermined values of the switching frequency may be determined based on switching power loss incurred by the VR 120 and the corresponding value of the load current (i.e., at the corresponding load level).

Equation (1) represents an example relationship of the switching frequency (f) of the VR 120 and the switching power loss within the VR 120 for a given value of the load current ($I_{load}$).

$$f = \frac{2 \times \text{Switching Power Loss}}{I_{load} \times V_{in} \times ([t_{rH} + t_{fH}] + [t_{rL} + t_{fL}])} \quad \text{Equation (1)}$$

Where, $V_{in}$ is an input voltage to the VR 120 and $t_{rH}$, $t_{fH}$, $t_{rL}$, $t_{fL}$ parameters of the switches (e.g., MOSFET) of the VR 120. In particular, the VR 120 may have two MOSFETs: a first MOSFET and a second MOSFET. A source terminal of the first MOSFET is not connected to the circuit ground, and hence the first MOSFET is referred to as a high-side MOSFET. On the other hand, a source terminal of the second MOSFET is connected to the circuit ground, and hence the second MOSFET is referred to as a low-side MOSFET.

$t_{rH}$=rise time interval of current and voltage waveforms for the high-side MOSFET,
$t_{fH}$=fall-time interval of current and voltage waveforms for the high-side MOSFET,
$t_{rL}$=rise time interval of current and voltage waveforms for the low-side MOSFET, and
$t_{fL}$=fall-time interval of current and voltage waveforms for the low-side MOSFET.

In accordance with equation (1), the switching power loss within the VR 120 may be reduced by reducing the switching frequency of the VR 120 for the given value of the load current. For example, the switching frequency of the VR 120 may be reduced to about 300 kilohertz (kHz). However, reducing the switching frequency lower than a certain value may negatively impact a transient response of the VR 120, which may be detrimental to the overall performance of the VR 120.

In accordance with some examples, a given predetermined value of the switching frequency of the VR 120 may be determined, using equation (1), to reduce the switching power loss within the VR 120 as well as maintain the performance of the VR 120 for the corresponding value of the load current. By reducing the switching power loss within the VR 120, the VR 120 may attain a predetermined power efficiency. The predetermined power efficiency of the VR 120 may be an improved power efficiency (e.g., a maximum power efficiency) of the VR 120 that can be achieved by reducing (e.g., minimizing) the switching power loss within the VR 120 for the given load current. In some examples, if the switching frequency of the VR 120 is adjusted to the predetermined value of the switching frequency, the switching power loss within the VR 120 may reduce and the VR 120 may operate at the predetermined power efficiency. In certain examples, the predetermined value of the switching frequency of the VR 120 may be determined to minimize the switching power loss within the VR 120 and thereby maximize the predetermined power efficiency of the VR 120.

In the examples described herein, a predetermined value of the switching frequency of the VR 120 may be determined corresponding to each of the plurality of load levels of the components 130, in a similar fashion as described above, to attain the corresponding predetermined power efficiency of the VR 120. In an example, the predetermined values of the switching frequency may be determined using equation (1) based on the respective values of the load current that correspond to the respective load levels of the components 130. In an example, each of the predetermined values of the switching frequency of the VR 120 may be a value of the switching frequency that may be determined to reduce the switching power loss within the VR 120 and thereby attain the corresponding predetermined power efficiency of the VR 120 for each of the plurality of load levels of the component 130.

The predetermined values of the switching frequency of the VR 120 may be determined in advance. In an example, the predetermined values of the switching frequency may be determined by an administrator, a user, or a computer program based on the relationship of equation (1) and stored in the machine-readable storage medium 125 as the repository 128. Accordingly, the repository 128 may include the predetermined values of the switching frequency of the VR 120 corresponding to one or both the plurality of load levels of the component 130 or the plurality of corresponding values of the load current. Further, in some examples, the repository 128 may include the predetermined power efficiency and the switching power loss corresponding to each of the predetermined values of the switching frequency.

In some examples, the repository 128 may be a lookup table that includes mapping between the plurality of predetermined values of the switching frequency of the VR 122 and one or both of the plurality of load levels of the component 130 or the plurality of values of the load current. Table 1 shows an example lookup table that includes predetermined values of the switching frequency of the VR 120 corresponding to load currents that are indicative of the load levels (10 percent, 20 percent, 30 percent, . . . 100 percent) of the component 130 for the maximum load current of 205 A. For illustration purposes, Table 1 is also shown to include values of the switching power loss and the predetermined power efficiency of the VR 120 corresponding to each predetermined value of the switching frequency of the VR 120. In one example, the switching power loss may be determined based on the example relationship of Equation (1). Also, a value of the power efficiency of the VR 120 may be determined as a ratio of power generated (i.e., an output power) by the VR 120 to power received (i.e., an input power) by the VR 120. The output power of the VR 120 may be determined by using example relationships represented by equations (2) and (3).

Output Power=Input Power−Power loss  Equation (2)

where, Power Loss of the VR 120 is a total power loss within the VR 120, that includes the switching power loss. The total power loss within the VR 120 may reduce as the switching power loss within the VR 120 reduces.

TABLE 1

Example look-up table

| Load Current (amps) | Load Level | Predetermined value of Switching Frequency (kHz) | Switching Power Loss (Watt) | Predetermined Power Efficiency (%) |
|---|---|---|---|---|
| 20.5 | 10% | 300 | 1.6240 | 95.416 |
| 41 | 20% | 350 | 3.7880 | 94.572 |
| 61.5 | 30% | 400 | 5.9040 | 94.244 |
| 82 | 40% | 450 | 7.9700 | 94.033 |
| 102.5 | 50% | 500 | 10.455 | 93.622 |
| 123 | 60% | 550 | 12.989 | 93.276 |
| 143.5 | 70% | 600 | 16.531 | 92.595 |
| 164 | 80% | 650 | 20.467 | 91.915 |
| 184.5 | 90% | 700 | 24.797 | 91.227 |
| 205 | 100% | 750 | 29.520 | 90.546 |

During operation, the VR controller 122 may receive the operational information of the component 130. As noted above, the VR controller 122 may receive the operational information of the component 130 from the system controller 118 via the communication link 116. In some examples, when the VR controller 122 receives the operational information of the component 130, the VR controller 122 may receive load information (e.g., a value of the load current) corresponding to the component 130. The load information may be indicative of a load level of the component 130. In an example, the load information may include a value of the load current drawn by the component 130 at the load level of the component 130. In some examples, the VR controller 122 may determine the load level of the component 130 as a percentage of the maximum load level based on the received load information (e.g., the value of the load current drawn by the component 130) and the maximum load current of the component 130. For example, if the maximum load current of the component 130 is 205 amperes (A) and a value of the load current drawn by the component 130 is 82 A (received by the management controller 118 as the load information) at a point in time, the load level of the component 130 may be determined as being 40 percent at that point in time.

Once the VR controller 122 receives the load information, the VR controller 122 may determine the predetermined value of the switching frequency from the repository 128 based on the load information. In some examples, the VR controller 122 may determine the predetermined value of the switching frequency from the repository 128 corresponding to the received value of the load current and/or the determined load level. In certain examples, the VR controller 122 may select the predetermined value of the switching frequency, from the repository 128 (e.g., lookup table), corresponding to the received value of the load current. For example, if the VR controller 122 receives the load information indicative of the component 130 drawing the load current of 123 A, the VR controller 122 may select the predetermined value of 550 kHz from the lookup table (e.g., Table 1) corresponding to the load current of 123 A. In some other examples, the VR controller 122 may determine the load level of the component 130 corresponding to the received value of the load current and then select the predetermined value of the switching frequency from the repository 128 (e.g., lookup table) corresponding to the determined load level.

Once the VR controller 122 determines the predetermined value of the switching frequency based on the load information of the component 130, the VR controller 122 may adjust the switching frequency of the VR 120 to the predetermined value of the switching frequency. By adjusting the switching frequency of the VR 120 to the predetermined value of the switching frequency, the switching power loss within the VR 120 may reduce and the VR 120 may operate at the predetermined power efficiency. In some examples, when the VR 120 operates at the adjusted switching frequency, the power loss with the VR 120 may be minimized, and hence the power efficiency of the VR 120 may be maximized.

Figure 2:
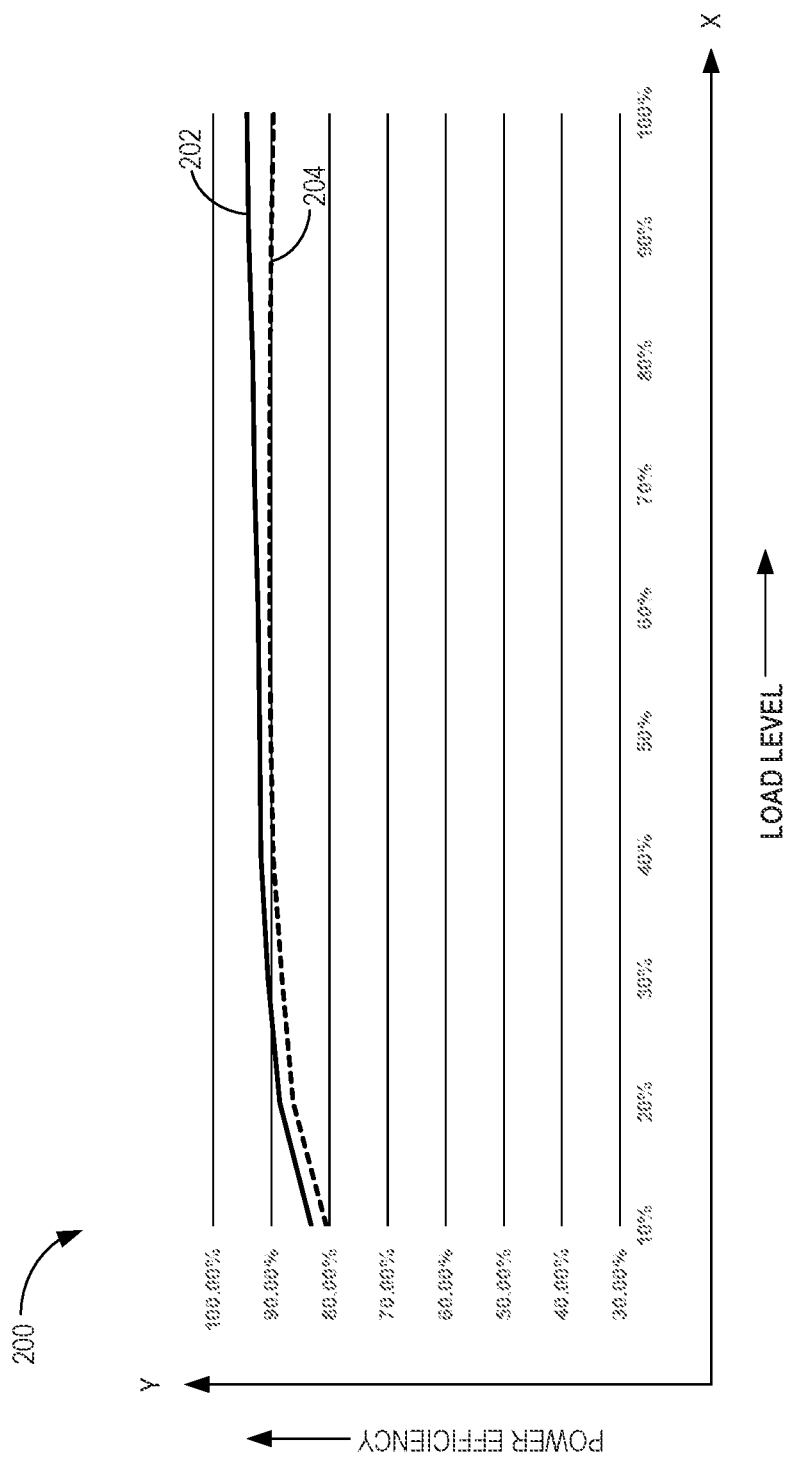
FIG. 2 is a graphical representation showing comparative power efficiencies of a voltage regulator while operating using an example method and a comparative method.

FIG. 2 is a graphical representation showing comparative power efficiencies of a voltage regulator (e.g., the VR 120) while operating using an example method (Example 1) and a comparative method (Example 2). FIG. 2 shows a graph 200 having an X-axis representing load level of the component 130 and a Y-axis representing measured power efficiency of the VR 120. In the graph 200, Curve 202 represents power efficiencies of the VR 120 in Example 1 when the VR 120 was operated at the adjusted switching frequencies (as shown in Table 1) for different load levels of the component 130 and Curve 204 represents power efficiencies of the VR 120 in Example 2 when the VR 120 was operated at a fixed switching frequency for the different load levels of the component 130. In Example 2, the fixed switching frequency is the switching frequency (e.g., 750 kHz) of the given VR that was set to operate for 100 percent load level of the component 130. In FIG. 2, the power efficiencies of the VR 120 as shown by Curve 202 in Example 1 are lower than the calculated power efficiencies as shown in Table 1 due to some other power losses (e.g., impedance power loss in the computing system 112) and the measurement tolerance from the test equipment.

It is clear from FIG. 2, that the power efficiency of the VR 120 in Example 1 (curve 202) has improved (from 1% to 2%) for each load level of the component 130 when the VR 120 was operated at the corresponding adjusted switching frequency as compared to that of the power efficiency of the VR 120 in Example 2 (curve 204) when the VR 120 was operated at the fixed switching frequency.

Figure 3:
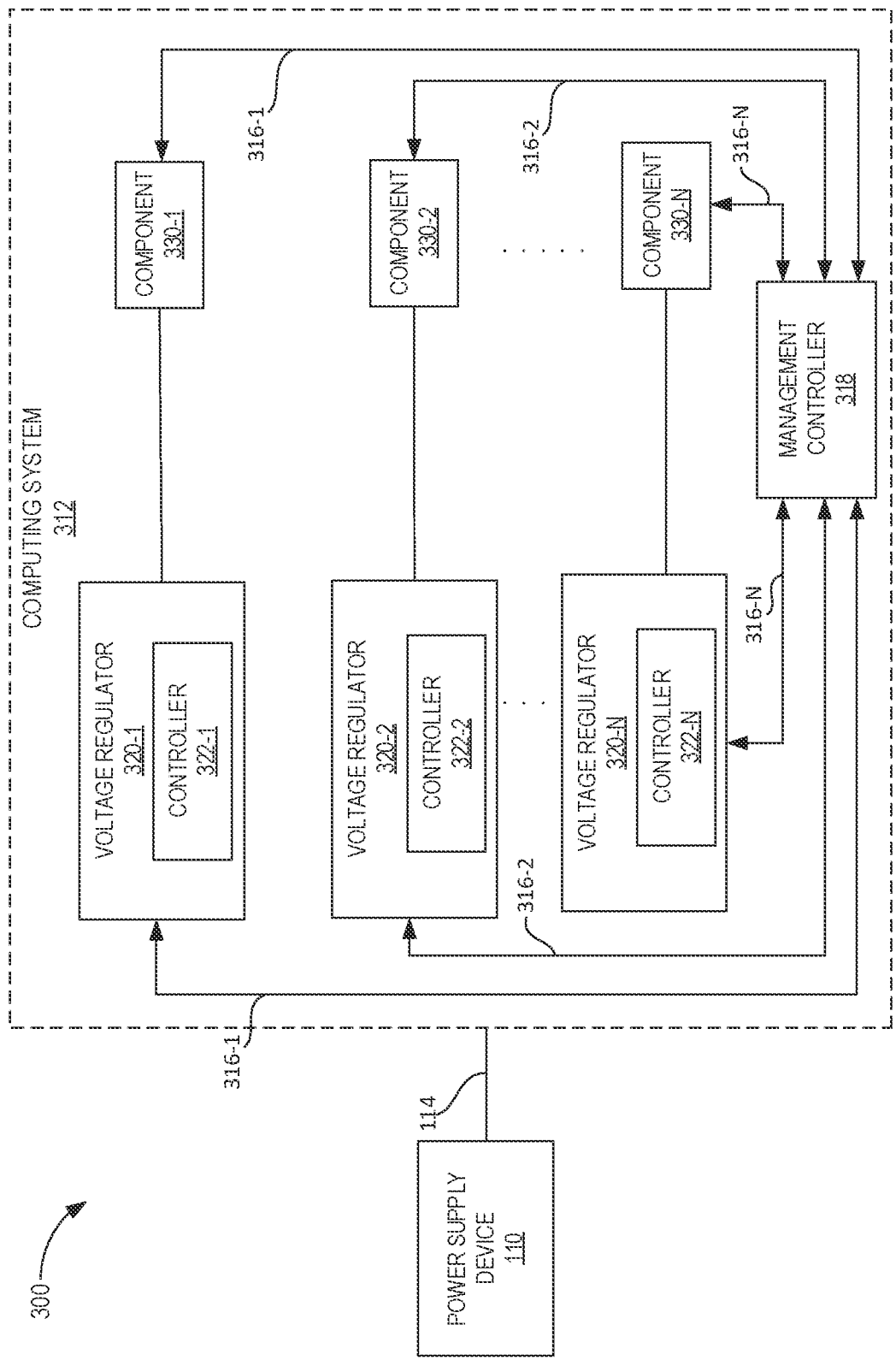
FIG. 3 is a block diagram of a system including a power supply device and a computing system, in accordance with another example.

FIG. 3 is a block diagram of a system 300, in accordance with another example. The system 300 may include certain elements similar to those described in FIG. 1 which are marked with similar reference numerals, a description of which is not repeated herein. In comparison to FIG. 1, a computing system 312 of FIG. 3 is shown to include various components. The computing system 312 may include components 330-1, 330-2, . . . 330-N. Each of the components 330-1, 330-2, . . . 330-N may be similar to the component 130 of FIG. 1. In an example, the component 330-1 may be a processor and the component 330-2 may be a memory associated with the processor. The operation of each of the components 330-1, 330-2, . . . 330-N may be managed by a system controller 318, which is similar to the system controller 118 of FIG. 1. The components 330-1, 330-2, . . . 330-N are, individually, coupled to voltage regulators 320-1, 320-2, . . . 320-N. The components 330-1, 330-2, . . . 330-N may be configured to receive respective regulated power from the respective VRs 320-1, 320-2, . . . 320-N. Each of the VRs 320-1, 320-2, . . . 320-N is similar to the VR 120 of FIG. 1 and may be configured to generate an output voltage and deliver a load current to the corresponding components 330-1, 330-2, . . . 330-N based on their loads.

In a similar fashion as described in FIG. 1, the VRs 320-1, 320-2, . . . 320-N may be managed by respective controllers 322-1, 322-2, . . . 322-N and the VR controllers 322-1, 322-2, . . . 322-N may store respective repositories (similar to the repository 128) for the respective VRs 320-1, 320-2, . . . 320-N. Further, the system controller 318 may be coupled to the components 330-1, 330-2, ... 330-N and the corresponding VR controllers 322-1, 322-2, ... 322-N via respective communication links 316-1, 316-2, ... 316-N. Each of the communication links 316-1, 316-2, ... 316-N is similar to the communication link 116 of FIG. 1.

During operation, the VR controllers 322-1, 322-2, ... 322-N may, individually, receive respective load information corresponding to the respective components 330-1, 330-2, ... 330-N. The VR controllers 322-1, 322-2, ... 322-N may further determine predetermined values of the respective switching frequencies from the respective repositories based on the respective received load information. The VR controllers 322-1, 322-2, ... 322-N may then, individually, adjust the respective switching frequencies of the respective VRs 320-1, 320-2, ... 320-N to the respective predetermined values of the respective switching frequencies to reduce the switching power losses in the respective VRs 320-1, 320-2, ... 320-N and operate the respective VRs 320-1, 320-2, ... 320-N at the respective predetermined power efficiencies. In this manner, when the VRs 320-1, 320-2, ... 320-N of the computing system 112 operate at the respective predetermined power efficiencies, the VRs 320-1, 320-2, ... 320-N may save power and contribute to overall power saving.

Figure 4:
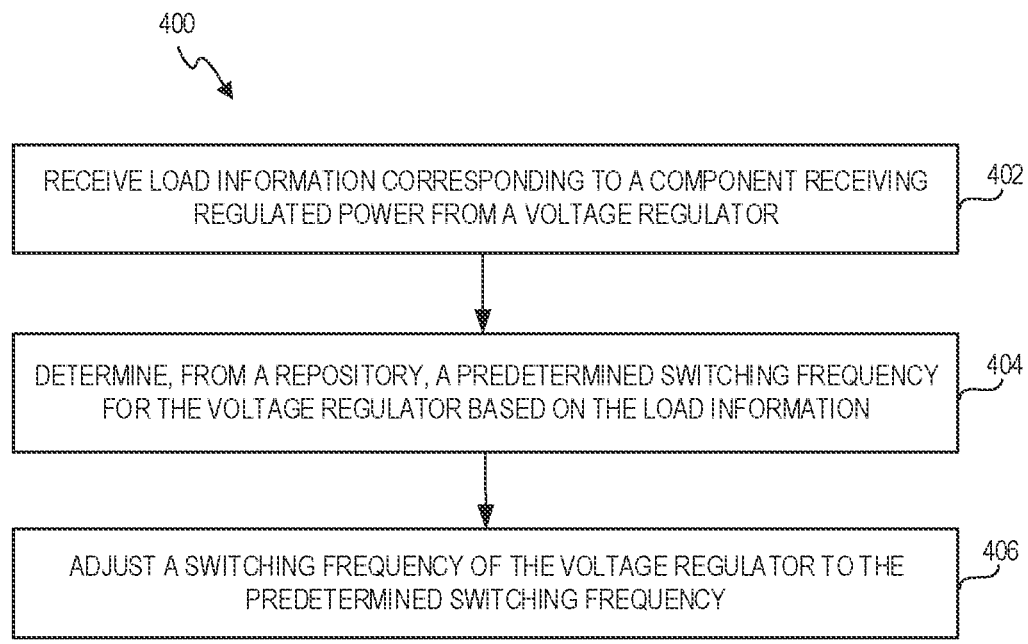
FIG. 4 is a flowchart of a method for adjusting a switching frequency of a voltage regulator, in accordance with an example.

FIG. 4 is a flowchart of a method 400 for adjusting a switching frequency of a voltage regulator to operate the voltage regulator at a predetermined power efficiency, in accordance with some examples. The method 400 can be executed by a controller (e.g., the VR controller 122 of FIG. 1) and is described with reference to FIG. 1. However, other devices suitable for the execution of the method 400 of FIG. 4 may be used as well. The functionalities described above with respect to the VR controller 122 can apply to the method 400. While only a few blocks are shown in the method 400, the method 400 may include other actions described herein. Additionally, although the blocks are shown in an order, blocks depicted in FIG. 4 may be performed in any suitable order and at any time.

At block 402, the VR controller 122 may receive load information corresponding to the component 130. In an example, the load information may include a value of a load current delivered to the component 130 which is indicative of a load level of the component 130. In an example, the VR controller 122 may receive the load information from the system controller 118 via the communication link 116.

At block 404, the VR controller 122 may determine a predetermined value of a switching frequency of the VR 120 from the repository 128 based on the received load information to reduce a switching power loss within the VR 120 and thereby attain a predetermined power efficiency of the VR 120. In an example, the VR controller 122 may determine, from the repository 128, the predetermined value of the switching frequency corresponding to the received load current that is indicative of the load level of the component 130. In some examples, the VR controller 122 may determine, from the repository 128, the predetermined value of the switching frequency corresponding to the load level of the component 130.

At block 406, the VR controller 122 may adjust the switching frequency of the VR 120 to the predetermined value of the switching frequency. In these instances, when the VR 120 operates at the adjusted switching frequency, the switching power loss within the VR 120 may reduce and the VR 120 may operate at the predetermined power efficiency.

Figure 5:
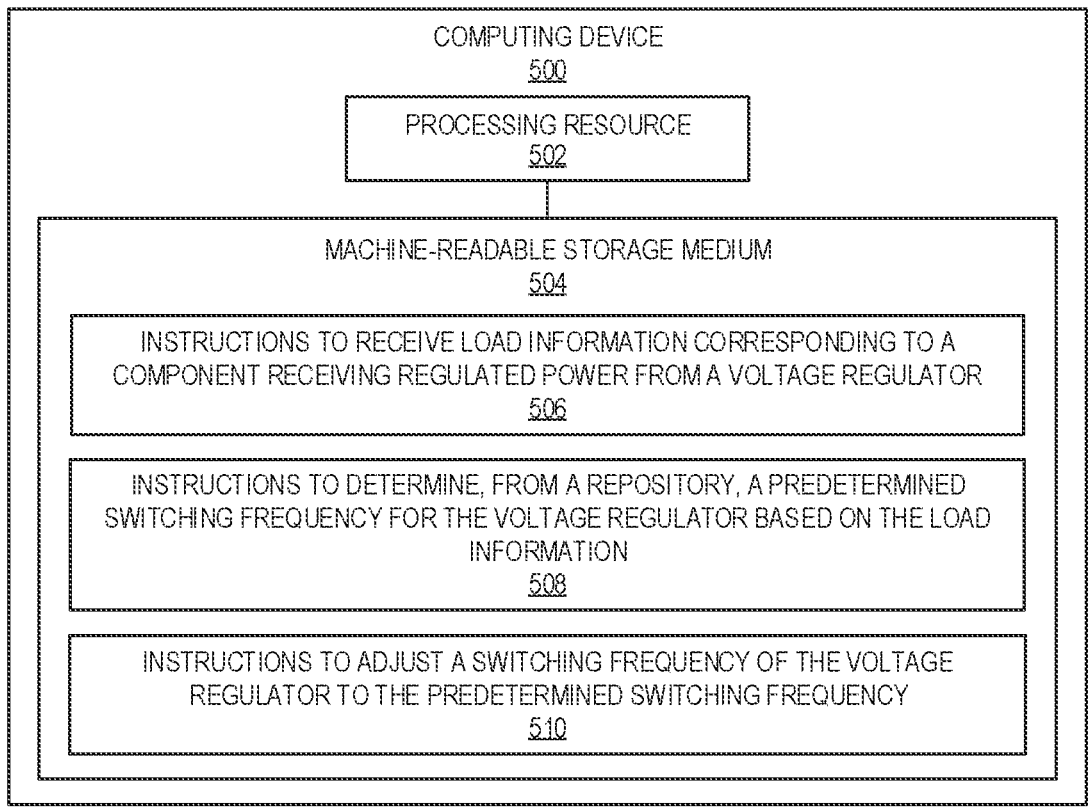
FIG. 5 is a block diagram of a computer system including instructions in a machine-readable storage medium for adjusting a switching frequency of a voltage regulator, in accordance with an example.

FIG. 5 is a block diagram of a computing system 500 including a processing resource 502 and a machine-readable storage medium 504 encoded with example instructions for adjusting a switching frequency of a voltage regulator to operate the voltage regulator at a predetermined power efficiency, in accordance with some examples. The machine-readable storage medium 504 may be non-transitory and is alternatively referred to as a non-transitory machine-readable storage medium 504. As described in detail herein, the machine-readable storage medium 504 may be encoded with executable instructions 506, 508 and 510 (hereinafter collectively referred to as instructions 506-510) for performing one or more method blocks of flowchart FIG. 4.

In some examples, the machine-readable storage medium 504 may be accessed by the processing resource 502. In some examples, the computing system 500 may be included in (e.g., as part of) a controller (e.g., the VR controller 122 of FIG. 1). In some examples, the processing resource 502 may represent one example of the processing resource 124 of the VR controller 122. Further, the machine-readable storage medium 504 may represent one example of the machine-readable storage medium 125 of the VR controller 122. In some examples, the processing resource 502 may fetch, decode, and execute the instructions 506-510 stored in the machine-readable storage medium 504. Although not shown, in some examples, the machine-readable storage medium 504 may be encoded with certain additional executable instructions to perform one or more functionalities performed by the VR controller 122, without limiting the scope of the present disclosure.

The instructions 506 when executed by the processing resource 502 may cause the processing resource 502 to receive load information corresponding to the component 130. In an example, the load information may be received from the system controller 118 via the communication link 116. The instructions 508 when executed by the processing resource 502 may cause the processing resource 502 to determine a predetermined value of a switching frequency of the VR 120 from the repository 128 based on the received load information to attain a predetermined power efficiency of the VR 120. Further, the instructions 510 when executed by the processing resource 502 may cause the processing resource 502 to adjust the switching frequency of the VR 120 to the predetermined value of the switching frequency to operate the VR 120 at the predetermined power efficiency.

In examples described herein, functionalities described as being performed by "instructions" may be understood as functionalities that may be performed by those instructions when executed by a processing resource. In other examples, functionalities described in relation to instructions may be implemented by one or more modules, which may be any combination of hardware and programming to implement the functionalities of the module(s).

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

The invention claimed is:
1. A method, comprising:
   causing a voltage regulator of a computing system to receive power from a power supply unit of the computing system, regulate the received power, and supply the regulated power to a processor of the computing system;

receiving, by a controller of the voltage regulator, load information indicative of an amount of current presently being drawn by the processor;

determining, by the controller, from a repository, a predetermined value of a switching frequency for the voltage regulator based on the load information to attain a predetermined power efficiency of the voltage regulator; and adjusting, by the controller, the switching frequency of the voltage regulator to the predetermined value of the switching frequency to operate the voltage regulator at the predetermined power efficiency.

2. The method of claim 1, wherein the load information comprises a value of a load current drawn by the processor, wherein the load current is indicative of a load level of the processor.

3. The method of claim 2, wherein determining the predetermined value of the switching frequency comprises determining, from the repository, the predetermined value of the switching frequency corresponding to the value of the load current.

4. The method of claim 1, wherein the load information comprises a value of a load current drawn by the processor, and wherein the method further comprises determining a load level of the processor, in terms of a percentage of a maximum load of the processor, based on the load current and a maximum load current supported by the processor.

5. The method of claim 4, wherein determining the predetermined value of the switching frequency comprises determining, from the repository, the predetermined value of the switching frequency corresponding to the load level of the processor.

6. The method of claim 1, wherein the predetermined value of the switching frequency is determined based on a value of a load current drawn by the processor and a power loss within the voltage regulator.

7. The method of claim 1, wherein the repository comprises a plurality of predetermined values of the switching frequency corresponding to a plurality of load levels of the processor or a plurality of values of a load current of the processor, wherein each value of the load current is indicative of a load level of the plurality of load levels.

8. The method of claim 7, wherein the repository comprises a lookup table storing mapping between a plurality of predetermined values of the switching frequency and one or both of a plurality of values of the load current or a plurality of values of the load level, and wherein the predetermined value of the switching frequency is selected from the lookup table corresponding to a value of the load current or a load level based on the load information.

9. A controller for a voltage regulator of a computing system, comprising:

at least one processing resource; and at least one machine-readable storage medium comprising instructions executable by the at least one processing resource to:

cause the voltage regulator to receive power from a power supply unit of the computing system, regulate the received power, and supply the regulated power to a processor of the computing system;

receive load information indicative of an amount of current presently being drawn by the processor;

determine, from a repository, a predetermined value of a switching frequency for the voltage regulator based on the load information to attain a predetermined power efficiency of the voltage regulator; and adjust the switching frequency of the voltage regulator to the predetermined value of the switching frequency to operate the voltage regulator at the predetermined power efficiency.

10. The controller of claim 9, wherein the load information comprises a value of a load current drawn by the processor, wherein the load current is indicative of a load level of the processor.

11. The controller of claim 10, wherein the instructions to determine the predetermined value of the switching frequency comprise instructions to determine, from the repository, the predetermined value of the switching frequency corresponding to the value of the load current.

12. The controller of claim 10, wherein the instructions further comprise instructions to determine a load level of the processor, in terms of a percentage of a maximum load of the processor, based on the value of the load current and a maximum load current supported by the processor.

13. The controller of claim 12, wherein the instructions to determine the predetermined value of the switching frequency comprise instructions to determine, from the repository, the predetermined value of the switching frequency corresponding to the load level of the processor.

14. The controller of claim 9, wherein the predetermined value of the switching frequency is determined based on a value of a load current drawn by the processor and a power loss within the voltage regulator.

15. The controller of claim 9, wherein the repository comprises a plurality of predetermined values of the switching frequency corresponding to a plurality of load levels of the processor or a plurality of values of a load current of the processor, wherein each value of the load current is indicative of a load level of the plurality of load levels.

16. The controller of claim 15, wherein the repository comprises a lookup table storing mapping between the plurality of predetermined values of the switching frequency and one or both of the plurality of values of the load current or the plurality of load levels, and wherein the predetermined value of the switching frequency is selected from the lookup table corresponding to a value of the load current or a load level based on the load information.

17. A non-transitory machine-readable storage medium comprising instructions executable by at least one processing resource of a controller for a voltage regulator of a computing system, the instructions being executable to cause the controller to:

cause the voltage regulator to receive power from a power supply unit of the computing system, regulate the received power, and supply the regulated power to a processor of the computing system;

receive load information indicative of an amount of current presently being drawn by the processor;

determine, from a repository, a predetermined value of a switching frequency for the voltage regulator based on the load information to attain a predetermined power efficiency of the voltage regulator; and adjust the switching frequency of the voltage regulator to the predetermined value of the switching frequency to operate the voltage regulator at the predetermined power efficiency.

18. The non-transitory machine-readable storage medium of claim 17, wherein the load information comprises a value of a load current drawn by the processor, wherein the load current is indicative of a load level of the processor.

19. The non-transitory machine-readable storage medium of claim 18, wherein the instructions to determine the predetermined value of the switching frequency comprise instructions to determine, from the repository, the predetermined value of the switching frequency corresponding to the value of the load current or the load level of the processor.

20. The non-transitory machine-readable storage medium of claim 17, wherein the repository comprises a plurality of predetermined values of the switching frequency corresponding to a plurality of load levels of the processor or a plurality of values of a load current of the processor, wherein each value of the load current is indicative of a load level of the plurality of load levels.

* * * * *